US011870146B2

(12) United States Patent
Tong

(10) Patent No.: US 11,870,146 B2
(45) Date of Patent: Jan. 9, 2024

(54) ANTENNA WITH SWITCHABLE BEAM PATTERN

(71) Applicant: NXP USA, INC., Austin, TX (US)

(72) Inventor: Ziqiang Tong, Ottobrunn (DE)

(73) Assignee: NXP USA, INC., Austin, TX (US)

( * ) Notice: Subject to any disclaimer, the term of this patent is extended or adjusted under 35 U.S.C. 154(b) by 0 days.

(21) Appl. No.: 17/648,880

(22) Filed: Jan. 25, 2022

(65) Prior Publication Data

US 2023/0006355 A1 Jan. 5, 2023

Related U.S. Application Data

(62) Division of application No. 16/357,557, filed on Mar. 19, 2019, now Pat. No. 11,271,318.

(51) Int. Cl.

| | |
|---|---|
| ***H01Q 13/22*** | (2006.01) |
| ***H01Q 13/10*** | (2006.01) |
| ***H01Q 9/06*** | (2006.01) |
| ***H01Q 13/08*** | (2006.01) |

(52) U.S. Cl.

CPC ............... *H01Q 13/10* (2013.01); *H01Q 9/06* (2013.01); *H01Q 13/085* (2013.01)

(58) Field of Classification Search

CPC ...... H01Q 13/10; H01Q 13/085; H01Q 13/22; H01Q 13/12; H01Q 9/06; H01Q 25/002; H01Q 25/04; H01Q 5/342; H01Q 1/3233; H01Q 3/22; H01Q 21/005

See application file for complete search history.

(56) References Cited

U.S. PATENT DOCUMENTS

| | | | |
|---|---|---|---|
| 3,243,818 A | 3/1966 | Holtzman | |
| 3,524,189 A | 8/1970 | Jones, Jr. | |
| 3,848,256 A * | 11/1974 | Craven | H01Q 21/0043 343/768 |
| 3,990,079 A | 11/1976 | Epis | |
| 4,429,313 A | 1/1984 | Muhs, Jr. et al. | |
| 4,499,474 A | 2/1985 | Muhs, Jr. et al. | |

(Continued)

FOREIGN PATENT DOCUMENTS

| | | |
|---|---|---|
| CN | 201178135 Y | 1/2009 |
| CN | 104795626 A | 7/2015 |

(Continued)

OTHER PUBLICATIONS

Amadjikpe, A., "Integrated 60GHz Antenna on Multilayer Organic Package With Broadside and End-Fire Radiation", IEEE Transactions on Microwave Theory and Techniques, vol. 61, No. 1, Jan. 2013.

(Continued)

*Primary Examiner* — Awat M Salih

(57) ABSTRACT

A waveguide antenna (200) is disclosed, comprising: a first plurality (220) of slots (222,224), for producing a beam having a first radiation pattern (301) at a first resonant frequency (f1); and a second plurality (230) of slots (232, 234), for producing a beam having a second radiation pattern (302) at a second resonant frequency (f2). A method of operation of the waveguide antenna (200) is also disclosed, comprising: operating the transceiver at a first frequency (f1) to detect objects in a first field of view; and operating the transceiver at a second frequency (fa) to detect objects in a second field of view

20 Claims, 2 Drawing Sheets

(56) References Cited

U.S. PATENT DOCUMENTS

| | | | |
|---|---|---|---|
| 5,289,200 | A | 2/1994 | Kelly |
| 5,541,612 | A | 7/1996 | Josefsson |
| 2007/0069966 | A1 | 3/2007 | Rolnik |
| 2007/0069967 | A1 | 3/2007 | Artis et al. |
| 2008/0074338 | A1 | 3/2008 | Vacanti |
| 2010/0321265 | A1 | 12/2010 | Yamaguchi et al. |
| 2013/0162491 | A1 | 6/2013 | Yu |
| 2016/0056541 | A1 | 2/2016 | Tageman et al. |
| 2018/0198210 | A1 | 7/2018 | Tong et al. |

FOREIGN PATENT DOCUMENTS

| | | | | | |
|---|---|---|---|---|---|
| CN | 105406174 | A | | 3/2016 | |
| CN | 106532244 | A | | 3/2017 | |
| CN | 107146943 | | * | 3/2017 | |
| CN | 107317116 | | * | 6/2017 | |
| CN | 113161753 | | * | 7/2021 | |
| JP | 2007336459 | A | | 12/2007 | |
| JP | 2011254220 | A | | 12/2011 | |
| TW | 201806240 | A | | 12/2018 | |
| WO | WO-2009107216 | A1 | * | 9/2009 | ............. H01Q 13/22 |
| WO | 2011013633 | A1 | | 2/2011 | |
| WO | WO-2018145300 | A1 | * | 8/2018 | ............. H01Q 21/00 |

OTHER PUBLICATIONS

Hall, G., “The ARRL Antenna Book”, The American Radio Relay League, ISBN: 0-87259-206-5, Jan. 1, 1988.

* cited by examiner

ANTENNA WITH SWITCHABLE BEAM PATTERN

CROSS-REFERENCE TO RELATED APPLICATIONS

This application is a divisional application of a U.S. patent application entitled "ANTENNA WITH SWITCHABLE BEAM PATTERN", having a Ser. No. of 16/357,557, having a filing date of Mar. 19, 2019, having common inventors, and having a common assignee, all of which is incorporated by reference in its entirety.

FIELD OF THE INVENTION

The present invention relates to an antenna with a switchable beam pattern.

BACKGROUND OF THE INVENTION

A conventional slot waveguide antenna 100 is shown in FIGS. 1A and 1B. It comprises a hollow metallic tube 102 with a rectangular cross-section orthogonal to the axial direction z of the tube 102. The antenna 100 has an upper broad side 104, a lower broad side 106, a left narrow side 108 and a right narrow side 110. On the upper broad side 104, a plurality of slots 120, 130 are formed, arranged in two groups. One group 120 of slots 122, 124, 126 are formed to the left of a longitudinally-extending centre line 112 of the upper broad side 104. The other group 130 of slots 132, 134, 136 are formed to the right of the centre line 112 of the upper broad side 104. The two groups of slots 120, 130 are interlaced on opposite sides of the centre line 112. For the first group 120 of slots, the slot pitch 128 is Ag, where Ag is the wavelength of the radiation in the guide. For the second group 130 of slots, the slot pitch 138 is also Ag, but the slots are shifted longitudinally by 0.5 Ag. That is, the slot pitch for slots on different sides of the centre line 112 is 0.5 Ag. Therefore all the slots radiate in phase to produce a main beam in a broadside direction, i.e. the y direction, normal to the longitudinal direction z of the waveguide 100.

SUMMARY OF THE INVENTION

Aspects of the invention are set out in the accompanying claims. Combinations of features from the dependent claims may be combined with features of the independent claims as appropriate and not merely as explicitly set out in the claims.

According to a first aspect of the invention, there is provided a waveguide antenna comprising:

a first plurality of slots, for producing a beam having a first radiation pattern at a first resonant frequency; and a second plurality of slots, for producing a beam having a second radiation pattern at a second resonant frequency.

The present invention may therefore be used to switch between a beam having a first radiation pattern, produced by inputting radiation at a frequency at or near the first resonant frequency, and a beam having a second radiation pattern, produced by inputting radiation at a frequency at or near the second resonant frequency. The radiation patterns may be different, for example to produce two different fields of view for the antenna.

In some embodiments, said first plurality of slots are spaced apart according to a first pitch, and said second plurality of slots are spaced apart according to a second pitch, wherein said first pitch and said second pitch are different.

In particular, the ratio of the first pitch to the first resonant frequency may differ from the ratio of the second pitch to the second resonant frequency.

In some embodiments, said first plurality of slots have a spacing of Ag1, where 71.91 is the wavelength of radiation at said first resonant frequency in the waveguide.

In some embodiments, said second plurality of slots have a spacing of 71.92/2, where 71.92 is the wavelength of radiation at said second resonant frequency in the waveguide.

Said first and second pluralities of slots may be provided on a broad side of a rectangular waveguide antenna.

Said first and second pluralities of slots may be provided on opposite sides of a longitudinal centreline of said broad side.

Said antenna may comprise a substrate integrated waveguide (SIW).

For example, the waveguide antenna may have sidewalls comprising conducting vias within a dielectric substrate in which the antenna is provided.

Said first and second resonant frequencies may be in the radar frequency range.

Said first resonant frequency and/or said second resonant frequency may be in the range 60 to 90 GHz.

Said first resonant frequency and/or said second resonant frequency may be in the range 76 to 81 GHz.

The above frequency ranges are particularly useful for automotive radar applications.

Said first resonant frequency and/or said second resonant frequency may have a bandwidth of less than 2 GHz.

This enables the first and second resonant frequencies to be accommodated within a frequency range of around 5 GHz (e.g. within the 76 to 81 GHz range).

A length of each slot of said first plurality of slots may be in the range from 1 mm to 1.4 mm.

The waveguide antenna may be a rectangular waveguide antenna having a broadside of width in the range 1.4 mm to 1.6 mm.

According to another aspect of the invention, there is provided a transmitter, receiver or transceiver, comprising a waveguide antenna as defined above.

According to another aspect of the invention, there is provided a method of operating a transceiver comprising a waveguide antenna as defined above, the method comprising:

operating the transceiver at a first frequency to detect objects in a first field of view; and operating the transceiver at a second frequency to detect objects in a second field of view.

BRIEF DESCRIPTION OF THE DRAWINGS

Embodiments of the present invention will be described, by way of example only, with reference to the accompanying drawings in which like reference signs relate to like elements and in which.

DETAILED DESCRIPTION

Figure 1A:
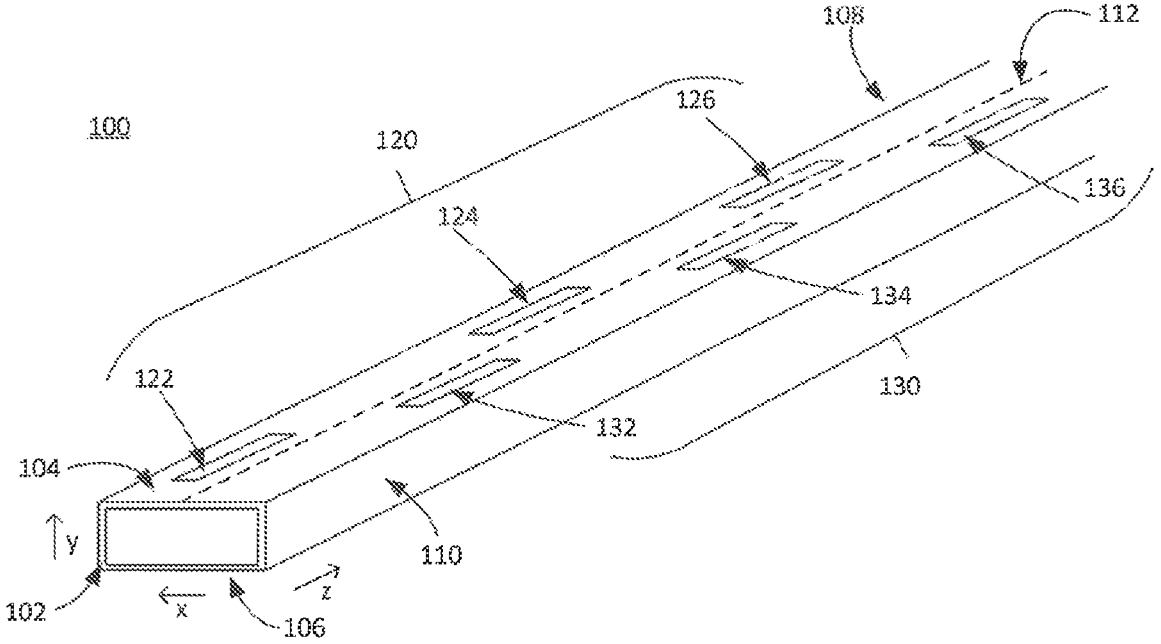
FIGS. 1A and 1B respectively show a perspective view and plan view of a schematic representation of an example waveguide antenna useful for understanding the present invention.
Figure 1B:
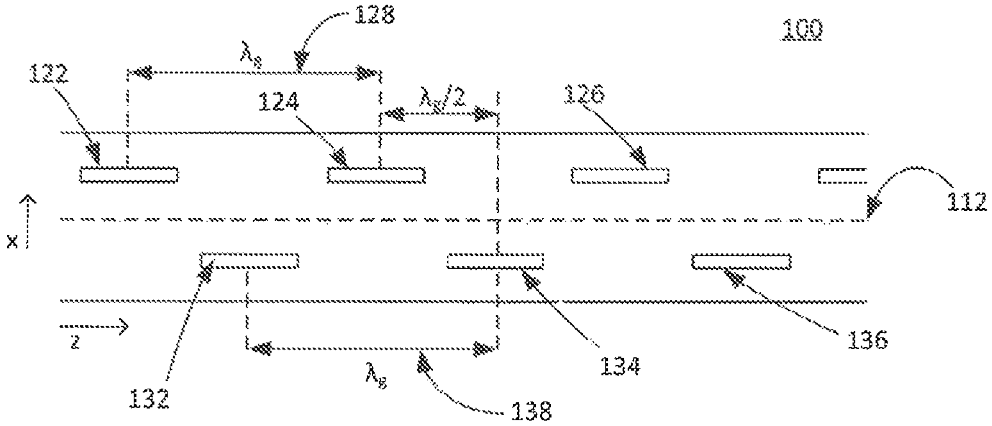
Figure 2A:
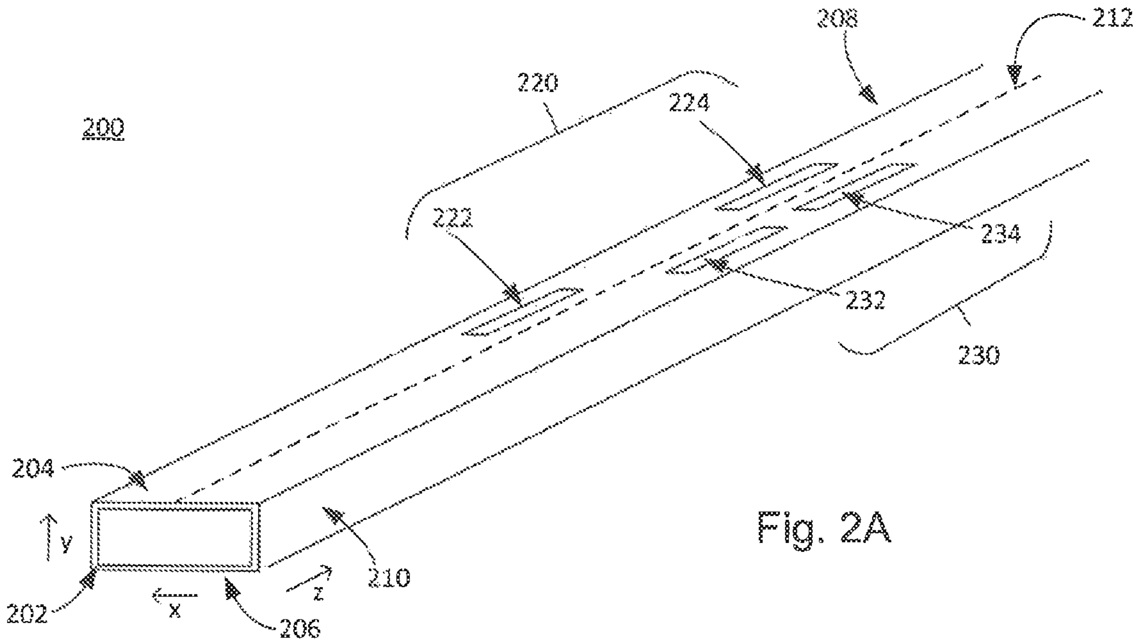
FIGS. 2A and 2B respectively show a perspective view and plan view of a schematic representation of a waveguide antenna according to an embodiment of the present invention.
Figure 2B:
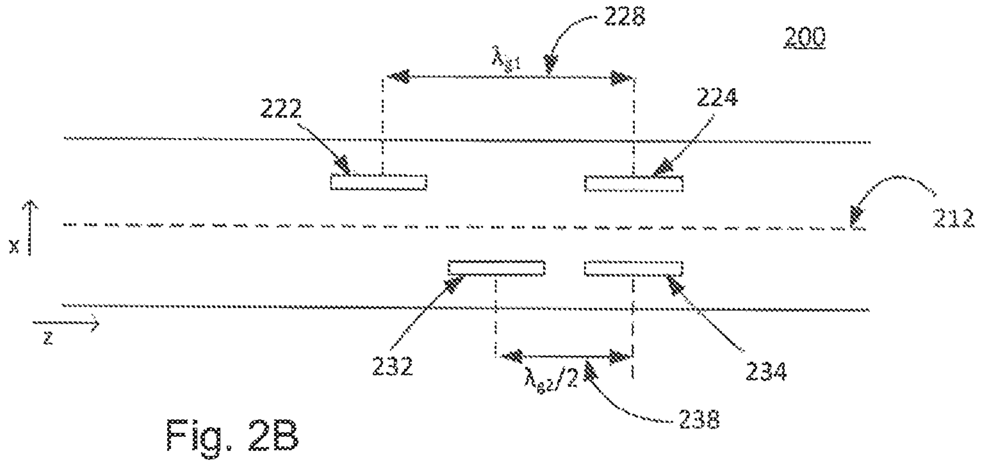
Figure 3:
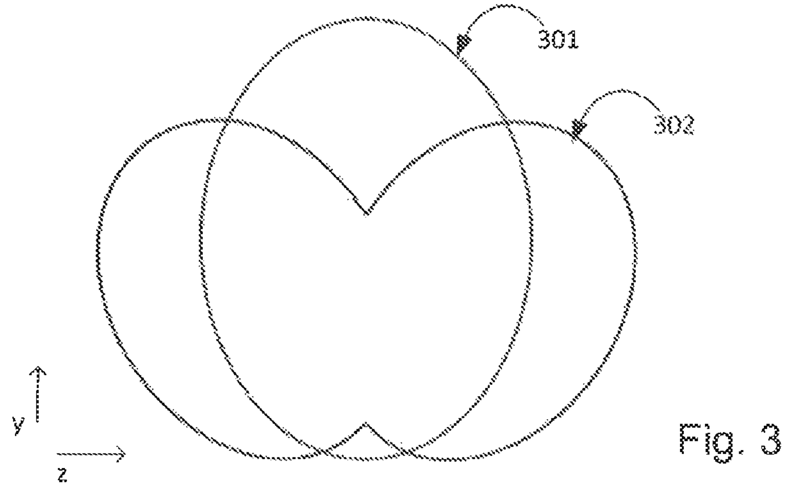
FIG. 3 illustrates radiation patterns obtained using the waveguide antenna illustrated in FIGS. 2A and 2B, for two different input frequencies.

With reference to FIGS. 2A, 2B and 3, a waveguide antenna 200 according to an embodiment of the present invention comprises a first plurality of slots 220, for producing a beam having a first radiation pattern 301 at a first resonant frequency f1. and a second plurality of slots 230, for producing a beam having a second radiation pattern 302 at a second resonant frequency fa.

The waveguide antenna 200 comprises a tube 202 having a substantially rectangular cross-section orthogonal to the axial direction z of the tube 202. The antenna 200 has an upper broad side 204, a lower broad side 206, a left narrow side 208 and a right narrow side 210.

The waveguide antenna 200 may be implemented as a substrate integrated waveguide (SIW). For example, the waveguide antenna 200 may be implemented in a dielectric substrate, the upper and lower broadsides 204, 206 of the antenna 200 being provided by respective metal coatings on the upper and lower surfaces of the dielectric substrate, and the sidewalls 208,210 being implemented within the substrate using arrays of metal posts, closely packed vias, or by metallized grooves, using techniques known in the art.

The first plurality of slots 220 and the second plurality of slots 230 are provided on the upper broad side 204. The first plurality 220 of slots 222, 224 is formed to the left of a longitudinally-extending centre line 212 of the upper broad side 204. The second plurality 230 of slots 232, 234 is formed to the right of the centre line 212 of the upper broad side 204.

In this embodiment, the first plurality 220 of slots are spaced apart according to a first slot pitch 228 of 1'.91, where 1'.91 is the wavelength in the guide of radiation at frequency f1, whereas the second plurality 230 of slots are spaced apart according to a second slot pitch 238 of –A.92/2, where –A.92 is the wavelength in the guide of radiation at frequency fa.

Thus, when radiation having a frequency f1 is input to the waveguide 200, the phase difference between adjacent slots of the first plurality of slots 220 is 360° and the first plurality 220 of slots therefore radiate in phase to produce a beam having the first radiation pattern, illustrated by the gain curve 301 shown in FIG. 3. In contrast, when radiation having a frequency fa is input to the waveguide 200, the phase difference between adjacent slots of the second plurality of slots 230 is 180° and the second plurality of slots radiate in anti-phase to produce a beam having the second radiation pattern, illustrated by the gain curve 302 shown in FIG. 3. In both cases, the beam radiated from the waveguide antenna 200 is polarised in the x direction. As can be seen in FIG. 3, the radiation pattern 301 peaks at zero azimuth angle, whereas the radiation pattern 302 has twin peaks on both sides of the azimuth. The second radiation pattern 302 is therefore significantly broader than the first radiation pattern 301, thereby providing a broader field of view. This is useful in automotive radar applications, as a narrow field of view is needed for sensing objects immediately in front of the vehicle, such as a vehicle in front, and a wider field of view is needed for sensing objects in the surroundings, such as other vehicles and pedestrians on either side of the vehicle. Different radiation patterns may also be used to provide information at different elevations. Allowing for multiple fields of view to be obtained using a single antenna enables a reduction in the amount of hardware required, and allows the field of view to be switched simply by switching the operating frequency of the antenna. The skilled person will appreciate that other radiation patterns may be used depending on the applications required.

The first and second resonant frequencies f1 and fa may be separated by a frequency difference substantially greater than or equal to the bandwidth of the first and second resonant frequencies. For example, each of the first and second resonant frequencies may have a bandwidth of less than 2 GHz, for example in the range 1 to 2 GHz. The first and second resonant frequencies f1 and fa may therefore coexist within the 76 to 81 GHz range, that is, within the automotive radar range, while being substantially non-overlapping. It is therefore possible to switch between the first and second radiation patterns by switching the input frequency to the waveguide antenna 200 between frequencies at or near the first and second resonant frequencies f1, fa.

As a first example, a substrate integrated waveguide (SIW) antenna based on a dielectric substrate having a relative permittivity of 3.1 may have a length and width of 8.625 mm and 1.5 mm respectively. The first plurality of slots 220 may be configured for a first resonant frequency f1 of about 83 GHz, and the second plurality of slots 230 may be configured for a second resonant frequency fa of about 75 GHz. For example, the slots 222, 224 of the first plurality of slots 220 may have a length of 1.2 mm, and the slots 232, 234 of the second plurality of slots 230 may have a length of 1.3 mm. The slot separation or pitch 228 between the slots 222, 224 of the first plurality 220 may be about 2.8 mm. The slot separation or pitch 238 between the slots 232, 234 of the second plurality 230 may be about 1.7 mm. The widths of all the slots 222, 224, 232, 234 may be around 0.07 mm, and the distance of the slots from the centreline 212 may be around 50 mm on each side.

As a second example, the substrate integrated waveguide (SIW) antenna of the first example above may be modified for use with a first resonant frequency f1 of about 81 GHz, and a second resonant frequency f2 of about 77 GHz, both frequencies being within the automotive radar band. In this second example, the slots 222, 224 of the first plurality of slots 220 may have a length of 1.22 mm, and the slots 232, 234 of the second plurality of slots 230 may have a length of 1.28 mm. The slot separation or pitch 228 between the slots 222, 224 of the first plurality 220 may be about 3 mm. The slot separation or pitch 238 between the slots 232,234 of the second plurality 230 may be about 1.6 mm. The widths of all the slots 222, 224, 232, 234 may be around 0.07 mm, and the distance of the slots from the centreline 212 may be around 50 mm on each side.

Although particular embodiments of the invention have been described above, it will be appreciated than many modifications, including additions and/or substitutions, may be made within the scope of the appended claims.

For example, the slots may be modified for producing beams at different resonant frequencies and/or to change the bandwidth of the resonances. The first and/or second plurality of slots may also be modified, for example by changing the angle of the slots with respect to the centreline 212. In some embodiments, each plurality of slots 220, 230 may comprise more than two slots. In some embodiments, more than two pluralities of slots 220, 230 may be provided, each configured for producing a beam of radiation at a different respective resonant frequency. The waveguide antenna may be implemented in PCB (printed circuit board), as an on-chip antenna, or as an antenna in package (AiP). The invention may also be applied to other types of waveguide antenna, such as an air-filled waveguide.

What is claimed is:

1. A method of operating a transceiver comprising a waveguide antenna having a first plurality of slots for producing a beam having a first radiation pattern at a first resonant frequency and a second plurality of slots for producing a beam having a second radiation pattern at a second resonant frequency, the method comprising:

generating the first radiation pattern to have peaks at zero azimuth based on a 360° phase difference between adjacent slots of the first plurality of slots, and generating the second radiation pattern to have twin peaks on both sides of azimuth based on a 180° phase difference between adjacent slots of the second plurality of slots and an anti-phase radiation of the adjacent slots of the second plurality of slots.

2. The method of claim 1, wherein said first and second resonant frequencies are in a radar frequency range.

3. The method of claim 1, wherein said first plurality of slots are spaced apart according to a first pitch and said second plurality of slots are spaced apart according to a second pitch, and wherein a ratio of said first pitch to said first resonant frequency is different from a ratio of said second pitch to said second resonant frequency.

4. The method of claim 1, wherein at least one of said first resonant frequency and said second resonant frequency is in a frequency range of 76 to 81 GHz.

5. The method of claim 1, wherein said first resonant frequency and/or said second resonant frequency has a bandwidth of less than 2 GHz.

6. The method of claim 1, wherein a length of each slot of said first plurality of slots is in a range from 1 mm to 1.4 mm.

7. A method of operating a transceiver comprising a waveguide antenna having a first plurality of slots for producing a beam having a first radiation pattern at a first resonant frequency and a second plurality of slots for producing a beam having a second radiation pattern at a second resonant frequency, the method comprising:

generating the first radiation pattern to have peaks at zero azimuth based on a 360° phase difference between adjacent slots of the first plurality of slots;

generating the second radiation pattern to have twin peaks on both sides of azimuth based on a 180° phase difference between adjacent slots of the second plurality of slots and an anti-phase radiation of the adjacent slots of the second plurality of slots, operating the transceiver at a first frequency to detect objects in a first field of view; and operating the transceiver at a second frequency to detect objects in a second field of view.

8. The method of claim 7, wherein the first plurality of slots are spaced apart according to a first pitch, and the second plurality of slots are spaced apart according to a second pitch, wherein a ratio of the first pitch to the first resonant frequency is different from a ratio of the second pitch to the second resonant frequency.

9. The method of claim 7, wherein the first plurality of slots have a spacing of $\lambda g1$, where $\lambda g1$ is the wavelength of radiation at the first resonant frequency in the waveguide.

10. The method of claim 7, wherein the second plurality of slots have a spacing of $\lambda g2/2$, where $\lambda g2$ is the wavelength of radiation at the second resonant frequency in the waveguide.

11. The method of claim 7, further comprising providing the first and second pluralities of slots on a broad side of a rectangular waveguide antenna.

12. The method of claim 11, further comprising providing the first and second pluralities of slots on opposite sides of a longitudinal centerline of the broad side.

13. The method of claim 7, wherein the antenna comprises a substrate integrated waveguide.

14. The method of claim 7, wherein the first and second resonant frequencies are in a frequency range characterized as the radar frequency range.

15. The method of claim 7, wherein a length of each slot of the first plurality of slots is in the range from 1 mm to 1.4 mm.

16. The method of claim 7, wherein the waveguide antenna is a rectangular waveguide antenna having a broadside of width in the range 1.4 mm to 1.6 mm.

17. A method of operating a transceiver comprising a waveguide antenna having a first plurality of slots for producing a beam having a first radiation pattern at a first resonant frequency and a second plurality of slots for producing a beam having a second radiation pattern at a second resonant frequency, the method comprising:

generating the first radiation pattern to have peaks at zero azimuth based on a 360° phase difference between adjacent slots of the first plurality of slots;

generating the second radiation pattern to have twin peaks on both sides of azimuth such that the second radiation pattern is significantly broader than the first radiation pattern;

operating the transceiver at a first frequency to detect objects in a first field of view; and operating the transceiver at a second frequency to detect objects in a second field of view.

18. The method of claim 17, wherein the first plurality of slots are spaced apart according to a first pitch, and the second plurality of slots are spaced apart according to a second pitch, wherein a ratio of the first pitch to the first resonant frequency is different from a ratio of the second pitch to the second resonant frequency.

19. The method of claim 17, wherein the first plurality of slots have a spacing of $\lambda g1$, where $\lambda g1$ is the wavelength of radiation at the first resonant frequency in the waveguide.

20. The method of claim 17, wherein the second plurality of slots have a spacing of $\lambda g2/2$, where $\lambda g2$ is the wavelength of radiation at the second resonant frequency in the waveguide.

* * * * *